Dec. 26, 1961     H. F. DEYERL     3,015,050
CAPACITOR STRUCTURE
Filed Dec. 13, 1955

INVENTOR.
HERMAN F. DEYERL
BY
Connolly and Hutz
HIS ATTORNEYS

3,015,050
CAPACITOR STRUCTURE
Herman F. Deyerl, Fort Wayne, Ind., assignor to Sprague Electric Company, North Adams, Mass., a corporation of Massachusetts
Filed Dec. 13, 1955, Ser. No. 552,912
2 Claims. (Cl. 317—242)

This invention relates to a novel structure for an electrical capacitor, and more particularly to a novel means for connecting electrical capacitors into an electrical circuit.

Electrical capacitors or condensers conventionally are provided with terminal leads or pigtails for connecting the capacitor electrodes into an electrical circuit. These leads are connected to their associated wiring or components by conventional connecting means such as soldering, for example.

When a conventionally connected capacitor must be replaced, the pigtail leads of the replacement capacitor must be soldered to the corresponding wiring in place of the defective unit. This soldering process requires the expenditure of care and time and exercise of skill by the repairman. Even with the exercise of the highest care, however, the associated circuit may be exposed to heat and stress when the new unit is soldered in place.

An object of this invention is to provide a structure for a capacitor that facilitates its connection into an electrical circuit.

In accordance with this invention, terminal members are electrically connected to each of the capacitor electrodes to provide means for connecting electrical leads from the associated electrical circuit to the capacitor. Each of these terminal members includes a tubular portion. This tubular portion has a bore which receives the lead wire size normally associated with the capacitor. The leads are electricaly connected within the tubular portions to the terminal members by means joining them in intimate contact, such as soldering or crimping.

Novel features and advantages of the present invention will become apparent to one skilled in the art from a reading of the following description in conjunction with the accompanying drawings in which.

Figure 1:
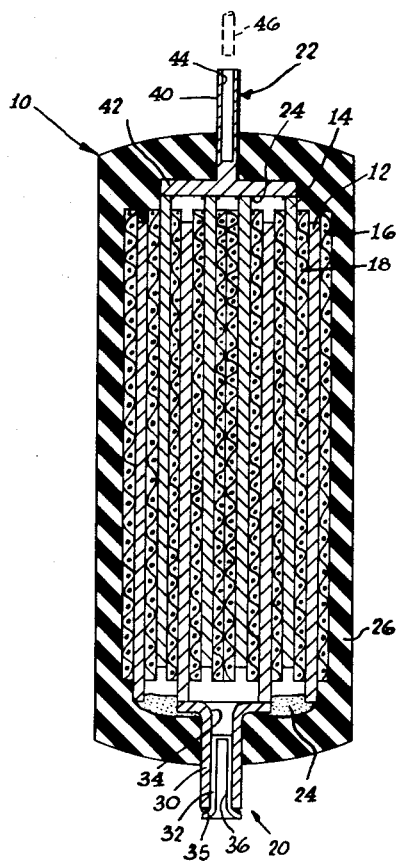
FIG. 1 is a cross-sectional view in elevation of an embodiment of the present invention.

In FIG. 1 is shown a tubular condenser of the molded type which is described in detail in U.S. Letters Patent 2,682,626. The terminal members of the capacitor 10 shown in FIG. 1, however, have been modified in accordance with this invention to facilitate connection into an electrical circuit.

The condenser 10 includes electrode foils 12 and 14 separated by dielectric spacing materials 16 and 18. The electrode foils 12 and 14 and dielectric spacers 14 and 16 are convolutely wound to form the tubular capacitor shown in FIG. 1. The dielectric spacers 16 and 18 are made, for example, of a porous dielectric spacer, such as paper, which is substantially completely impregnated with a liquid or solid dielectric material such as mineral oil, chlorinated napthalene, etc. The electrodes 12 and 14 are aluminum foils, for example.

A pair of terminal members 20 and 22 are connected to electrode foils 12 and 14 respectively by solder, for example, as shown at 24. These terminal members will be later described in detail. Terminal member 22 is a type which may be used with most types of condensers. Two of these terminal members are usually provided. Terminal member 20, however, is a special terminal member which permits impregnation of the dielectric spacer before molding.

The wound electrode foils and dielectric spacers together with the terminal members are encased within a molded resin casing 26 by pressure molding, for example. The molding resin may be, for example, a phenolformaldehyde resin as fully described in U.S. Letters Patent 2,682,626. The dielectric may be impregnated to protect the structure during the molding process. The impregnant, may be, for example an oil, such as mineral, vegetable or silicone oil suitable for dielectric use.

Terminal member 20 includes means for drying the interior of the molded unit and for impregnating the unit. The terminal member 20, therefore, includes a flanged tubular portion 30 which may be, for example, fabricated of tinned copper. A sealed tubular sleeve 32 is inserted within the bore 34 of the tubular member 30 to seal it from the external atmosphere. This internal tube 32 has a flared mouth 35 which may be sealed to the mouth of tubular portion 30 by soldering, for example, after the impregnating and drying process has been terminated. The sealed tube 32 may also be press fitted within the tubular portion 30 to provide intimate electrical contact without the necessity of soldering.

The terminal member 22 has a configuration which is adapted for use with a variety of types of electrical condensers either impregnated or non-impregnated. The terminal member 22 includes a tubular portion 40 and a portion 42 of extended area for connection to the associated electrode foil. The tubular portion 40 and connecting portion 42, are example, fabricated in one piece as a blind flanged tube of tinned copper, for example. The structure 22 is well adapted for mass production by automatic screw machines, for example. The tubular portion 40 has an internal bore 44 which receives the lead wire size normally associated with that type condenser. An electrical lead 46 shown in phantom may be conveniently inserted within the bore 44 of the terminal member. The lead 46 may be inserted within the bore 36 of terminal member 20 in a similar fashion. Terminal member 22, therefore, provides convenient means for initially connecting a capacitor of the type described into an electrical circuit, and particularly provides means for conveniently replacing a capacitor in service or maintenance work.

Capacitors of the type not requiring impregnation are provided with a pair of terminal members similar to the terminal member 22 which does not provide access to the interior of the condenser. The terminal member 20, however, illustrates that this invention may be adapted to provide access to the interior of a condenser for impregnation whenever desired.

When replacing a defective capacitor by a capacitor which embodies the present invention, the leads or wires are severed from the existing capacitor. They are then inserted within the bore of the tubular portions of the connectors and electrically connected thereto by soldering or crimping. The bores of the connectors may be tinned to facilitate the soldering process. A small deposit of solder may also be provided within the bore to provide a convenient means for soldering by mere application of heat. The tubular portions may be made of ductile and easily crushed material which can be intimately electrically connected to the associated leads by means of crimping. The bores may also be sized to provide a press fit with the associated leads to facilitate intimate electrical connection thereto.

Figure 2:
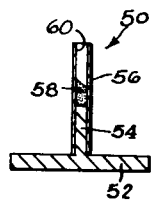
FIG. 2 is a cross-sectional view in elevation of portion of another embodiment of this invention.

In FIG. 2 is shown another form of terminal member 50 which is another embodiment of this invention. The terminal member 50 is made up of a disc 52 including a short axial shaft 54 centrally disposed thereupon. The disc and shaft 54 may be fabricated in one piece by standard mass production methods such as by an automatic screw machine, for example. The unit may be fabricated, for example, of tinned copper. A short length of tubing 56 is slipped over the shaft 54 to provide the tubular portion of the connector 50. This tube may be, for example, made of tinned copper. A small deposit of solder 58 may be provided within the bore 60 of the tube 56 to provide means for securing the tube 56 to the foil connecting portions 52 and 54 and also to provide means for conveniently connecting a pigtail lead to the assembled capacitor by more application of heat.

Figure 3:
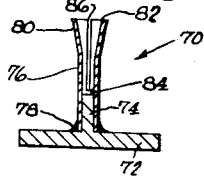
FIG. 3 is a cross-sectional view in elevation of a portion of a further embodiment of this invention.

In FIG. 3 is shown a terminal member structure 70 in accordance with this invention which can mechanically hold the capacitor in temporary or preliminary electrical contact with the lead wires for preliminary checking of its operational characteristics before premanently joining the capacitor into the circuit. This terminal member 70 includes a disc 72 having joined thereto at its midpoint a short axial shaft 74. The disc 72 and shaft 74 may be fabricated in one piece by standard mass-production methods. The disc 72 and stub shaft 74 may be conveniently made of tinned copper, for example. A short length of specially prepared tubing 76 is slipped over stub shaft 74 to provide the tubular portion of the member 70. The tubular portion 76 may be permanently joined to the member composed of disc 72 and stub shaft 74 by dip soldering which forms the solder joint shown at 78.

The end 80 of tubular member 76 remote from the disc 72 is expanded or flared to form a bell-mouthed entrance for a lead wire. The internal diameter 82 of the largest portion of the bell-mouthed end 80 is made slightly larger than the diameter of the largest lead wire size conventionally associated with a capacitor of the type including the terminal member 70. The internal diameter 84 of the unexpanded portion of the tubular member 76 is made slightly smaller than the diameter of the smallest lead wire size conventionally associated with a capacitor of the type including terminal member 70.

The tubular member 76 is longitudinally slotted at 86 from the bell-mouthed end to a point extending within the unexpanded or straight portion of member 76 to expand or spring out and firmly grip a lead wire inserted within the bell-mouthed end and forced a distance into the straight portion of the terminal member.

Since the bell-mouthed entrance is larger than the largest lead wire size to be encountered, the entire range of lead wires normally encountered can be inserted within the terminal member. Since the smallest internal diameter of the straight portion of the terminal member is smaller than the smallest diameter lead wire normally encountered, it firmly grips inserted lead wires by spring action. This provides sufficient temporary mechanical retention and electrical contact to examine the operational characteristics of the component before permanent connection is made. This permanent connection may be made by soldering, for example, or by solderless means, such as crimping.

When the tubular member 76 is made of conductive spring material, such as conductive tinned spring bronze for example, sufficient forceful contact on the lead is maintained to provide a dependable permanent electrical connection. A capacitor connected in this fashion would very easily be replaced without the use of a special tool or solder.

This terminal structure may be applied to a vast number of types of capacitors and it is, therefore, to be understood that the invention is not limited to the specific embodiments herein described except as defined in the appended claims.

What is claimed:

1. A capacitor including a pair of terminal members for connecting electrical leads thereto and electrode members separated by a dielectric material, said terminal members each comprising an electrode connector means and a lead connector means, each of said lead connector means including tubular portions, said tubular portions having bores which receive the lead wire size normally associated with said capacitor, sealing means for isolating said bores from the interior of said capacitor, said sealing means for at least one of said bores comprising a smooth-bored sealed tubular sleeve in press fit contact within said tubular portion and hermetically sealed thereto, said tubular sleeve having an open end which is arranged at the outer end of said tubular portion within which it is inserted to form one of said bores, and both of said bores of said tubular portions being maintained free for connection to a lead to facilitate the replacement of a connected capacitor by severing its leads and inserting them within said tubular portions.

2. A capacitor as set forth in claim 1 wherein said smooth-bored sealed tubular sleeve includes a flared mouth which is disposed outside of the end of said lead connector means within which it is inserted.

References Cited in the file of this patent

UNITED STATES PATENTS

| | | |
|---|---|---|
| 1,702,158 | Gagnon | Feb. 12, 1929 |
| 1,704,515 | Rau | Mar. 5, 1929 |
| 2,052,700 | Lange | Sept. 1, 1936 |
| 2,413,539 | Ballard | Dec. 31, 1946 |
| 2,634,315 | Allison et al. | Apr. 7, 1953 |
| 2,677,118 | Stone | Apr. 27, 1954 |
| 2,682,626 | Robinson et al. | June 29, 1954 |
| 2,704,880 | Brennan | Mar. 29, 1955 |
| 2,739,277 | Boisjolie | Mar. 20, 1956 |
| 2,777,976 | Brafman | Jan. 15, 1957 |
| 2,820,929 | Coy | Jan. 21, 1958 |
| 2,869,052 | Ness et al. | Jan. 13, 1959 |